United States Patent
Liu et al.

(10) Patent No.: US 11,981,212 B1
(45) Date of Patent: May 14, 2024

(54) COOPERATIVE CONTROL METHOD FOR ELECTRO-HYDRAULIC HYBRID BRAKING OF MIDDLE-LOW SPEED MAGLEV TRAIN

(71) Applicants: CRSC RESEARCH & DESIGN INSTITUTE GROUP CO., LTD., Beijing (CN); EAST CHINA JIAOTONG UNIVERSITY, Nanchang (CN)

(72) Inventors: Ling Liu, Nanchang (CN); Hui Yang, Nanchang (CN); Junfeng Cui, Nanchang (CN); Kunpeng Zhang, Nanchang (CN); Qi Wang, Nanchang (CN); Changyuan Wang, Nanchang (CN); Qi Wang, Nanchang (CN); Yanli Zhou, Nanchang (CN)

(73) Assignees: CRSC RESEARCH & DESIGN INSTITUTE GROUP CO., LTD., Beijing (CN); EAST CHINA JIAOTONG UNIVERSITY, Nanchang (CN)

( * ) Notice: Subject to any disclaimer, the term of this patent is extended or adjusted under 35 U.S.C. 154(b) by 0 days.

(21) Appl. No.: 18/368,463

(22) Filed: Sep. 14, 2023

(30) Foreign Application Priority Data

Feb. 22, 2023 (CN) .......................... 202310145681.X

(51) Int. Cl.
*B60L 15/00* (2006.01)
*B61H 9/00* (2006.01)
*G06N 5/022* (2023.01)

(52) U.S. Cl.
CPC .............. *B60L 15/005* (2013.01); *B61H 9/00* (2013.01); *G06N 5/022* (2013.01); *B60L 2200/26* (2013.01)

(58) Field of Classification Search
CPC ..... B60L 15/005; B60L 2200/26; B61H 9/00; G06N 5/022
See application file for complete search history.

(56) References Cited

U.S. PATENT DOCUMENTS 9,296,401 B1 * 3/2016 Palmer .................. B61L 25/025
10,108,850 B1 * 10/2018 Das ...................... G06V 10/955
(Continued)

FOREIGN PATENT DOCUMENTS

| CN | 106842924 A | 6/2017 |
| CN | 115047758 A | 9/2022 |

OTHER PUBLICATIONS

"Settle down brake control device and Maglev train" by CRRC Tangshan CO "WO2021184483" published Sep. 23, 2021 "translation".*

(Continued)

*Primary Examiner* — Hussein Elchanti
(74) *Attorney, Agent, or Firm* — True Shepherd LLC; Andrew C. Cheng

(57) ABSTRACT

A cooperative control method and system for electro-hydraulic hybrid braking of a middle-low speed maglev train is provided, which relates to the field of vehicle braking control. The method includes: denoising operation data of a middle-low speed maglev train; using a controlled autoregressive integrated moving average model as an electro-hydraulic hybrid braking process model for the middle-low speed maglev train, and processing denoised operation data by using a least square method to determine parameters in the controlled autoregressive integrated moving average model; establishing a generalized predictive control model with time lag compensation according to the controlled autoregressive integrated moving average model and a Smith predictor; and performing cooperative control on an electro-hydraulic hybrid braking process of the middle-low (Continued)

speed maglev train by using the generalized predictive control model with time lag compensation. A time lag in the electro-hydraulic hybrid braking process of the middle-low speed maglev train is reduced; control accuracy of the electro-hydraulic hybrid braking process of the middle-low speed maglev train is improved to a certain extent; and a speed tracking effect is improved.

5 Claims, 13 Drawing Sheets

(56) References Cited

U.S. PATENT DOCUMENTS

| | | | |
|---|---|---|---|
| 2010/0126374 A1* | 5/2010 | Ji | B61B 13/08 |
| | | | 104/282 |
| 2010/0241296 A1* | 9/2010 | Rhea, Jr. | B60T 17/228 |
| | | | 701/20 |
| 2012/0072088 A1* | 3/2012 | Cutright | B60T 13/665 |
| | | | 701/70 |
| 2012/0269383 A1* | 10/2012 | Bobbitt | G06T 7/0008 |
| | | | 382/103 |
| 2013/0018534 A1* | 1/2013 | Hilleary | B61L 29/30 |
| | | | 701/19 |
| 2013/0048795 A1* | 2/2013 | Cross | B61L 15/0027 |
| | | | 246/122 R |
| 2014/0339374 A1* | 11/2014 | Mian | B61L 29/30 |
| | | | 246/473.1 |
| 2015/0000415 A1* | 1/2015 | Kelley | B61L 5/206 |
| | | | 73/649 |
| 2015/0251561 A1* | 9/2015 | Konigorski | B64F 1/0299 |
| | | | 244/100 R |
| 2016/0114820 A1* | 4/2016 | Palmer | B61L 15/0072 |
| | | | 246/107 |
| 2021/0107538 A1* | 4/2021 | Howard | G06N 5/01 |
| 2021/0221340 A1* | 7/2021 | Annadurai | B60T 7/22 |
| 2021/0300445 A1* | 9/2021 | Ellis | B60L 13/06 |
| 2022/0177118 A1* | 6/2022 | Sharpe | F15D 1/0025 |

OTHER PUBLICATIONS

First Office Action for Chinese Application No. 202310145681.X, dated Apr. 5, 2023, 12 Pages (including English machine translation).

Notification to Grant Patent Right for Invention for Chinese Application No. 202310145681.X, dated Apr. 17, 2023, 3 Pages (including English machine translation).

* cited by examiner

COOPERATIVE CONTROL METHOD FOR ELECTRO-HYDRAULIC HYBRID BRAKING OF MIDDLE-LOW SPEED MAGLEV TRAIN

CROSS-REFERENCE TO RELATED APPLICATION

This application claims foreign priority benefits under 35 U.S.C. § 119(a)-(d) to Chinese Patent Application No. 202310145681.X filed on Feb. 22, 2023, which is hereby incorporated herein by reference in its entirety.

TECHNICAL FIELD

The present disclosure relates to the technical field of vehicle braking control, and in particular, to a cooperative control method for electro-hydraulic hybrid braking of a middle-low speed maglev train.

BACKGROUND

The maglev train is a new type of rail transit vehicle which can be suspended, driven and guided by electromagnetic force to realize suspending, which can effectively alleviate the urban traffic congestion and is one of future development directions of urban rail transit. Compared with a traditional wheel-rail train, the maglev train has stronger weathering resistance, smaller turning radius, longer service life, and lower operation noise. In addition, since a non-contact operation mode is adopted and the principle of magnetic suspension is adopted to replace a wheel-rail contact support structure of wheel-rail transit, there is no limitation to an adhesive force, and the climbing capability is stronger. With Shanghai maglev test line, Changsha airport express line and Beijing S1 line being put into use one after another, the operation control of the maglev train has become a hot-spot issue in the theoretical research field of rail transit. An operation control system is a central system to ensure the safe and stable operating of the maglev train, and an operation control algorithm is the most critical technique. However, at present, there is no mature control and decision making method in an operation process of the maglev train, especially in an electro-hydraulic hybrid braking process of the middle-low speed maglev train. Therefore, it is very urgent to study the operation control method for the middle-low speed maglev train and improve the operation control performance of the middle-low speed maglev train.

In the study of train operation control, relevant researchers proposed an intelligent driving algorithm based on an online adjustment method in combination with expert experience and a gradient descent algorithm. However, this method relies heavily on prior knowledge and has high requirements for computing power, so it is difficult to be applied in practice. Therefore, some scholars propose a train operation control algorithm based on fuzzy proportion integration differentiation (PID) on the basis of traditional train dynamics, which can improve the accuracy and robustness of speed control of the train operation control system. However, the above operation control methods are all aimed at the wheel-rail transit system, and the traction mode of the maglev train is different from that of the traditional wheel-rail train, so their operation control method are also quite different. Therefore, an existing mature operation control methods of the wheel-rail train are not suitable for the maglev train. In view of this, some scholars modify resistance coefficients under different operation conditions by using a particle swarm optimization-simulated annealing algorithm based on a traditional train dynamic model, and propose an operation control method for the maglev train based on a fractional order PID. However, the above control methods neglect a time lag of the electro-hydraulic hybrid braking process of the middle-low speed maglev train and time lag inconsistency in electro-hydraulic hybrid braking processes of different trains, which affects an actual operation control effect to a certain extent. Therefore, it is of great practical significance to study a cooperative control method for electro-hydraulic hybrid braking of a middle-low speed maglev train considering the time lag characteristic.

SUMMARY

An objective of some embodiments of the present disclosure is to provide a cooperative control method and system for electro-hydraulic hybrid braking of a middle-low speed maglev train, which reduces a time lag in an electro-hydraulic hybrid braking process of a middle-low speed maglev train.

To achieve the above objective, the present disclosure provides the following technical solutions.

A cooperative control method for electro-hydraulic hybrid braking of a middle-low speed maglev train includes:
  denoising operation data of a middle-low speed maglev train;
  using a controlled autoregressive integrated moving average model as an electro-hydraulic hybrid braking process model for the middle-low speed maglev train, and processing denoised operation data by using a least square method to determine parameters in the controlled autoregressive integrated moving average model;
  establishing a generalized predictive control model with time lag compensation according to the controlled autoregressive integrated moving average model and a Smith predictor; and
  performing cooperative control on an electro-hydraulic hybrid braking process of the middle-low speed maglev train by using the generalized predictive control model with time lag compensation.

Alternatively, the denoising operation data of a middle-low speed maglev train may specifically include:
  performing wavelet denoising on the operation data of the middle-low speed maglev train based on hard threshold processing.

Alternatively, the performing wavelet denoising on the operation data of the middle-low speed maglev train based on hard threshold processing may specifically include:
  decomposing the operation data by using db4 wavelet decomposition into three layers of detail components and one layer of approximate components to obtain wavelet detail coefficients for various layers of detail components of the three layers of detail components;
  processing the wavelet detail coefficients by a hard threshold processing method to obtain the processed wavelet detail coefficients for the various layers of detail components;
  performing threshold quantification processing on the one layer of approximate components to obtain an approximate coefficient; and
  reconstructing a signal according to the approximate coefficient and the processed wavelet detail coefficients for the various layers of detail components to obtain the denoised operation data.

Alternatively, the generalized predictive control model with time lag compensation may include an electric braking predictive control model, a hydraulic braking predictive control model, and an electro-hydraulic hybrid braking predictive control model;

the electric braking predictive control model is expressed as:

$$y_1(k) + \bar{a}_1 y_1(k-1) + \ldots + \bar{a}_{n_a+1} y_1(k-n_a-1) = b_0 \Delta u_1(k-1-N_1) + \ldots + b_{n_b} u_1(k-1-n_b-N_1);$$

the hydraulic braking predictive control model is expressed as:

$$y_2(k) + \bar{a}_1 y_2(k-1) + \ldots + \bar{a}_{n_a+1} y_2(k-n_a-1) = b_0 \Delta u_2(k-1-N_2) + \ldots + b_{n_b} u_2(k-1-n_b-N_2);$$

the electro-hydraulic hybrid braking predictive control model is expressed as:

$$\begin{cases} y_3(k) + \bar{a}_1 y_3(k-1) + \ldots + \bar{a}_{n_a-1} y_3(k-n_a-1) = \\ b_0 \Delta u_3(k-1-N_3) + \ldots + b_{n_b} \Delta u_3(k-1-n_b-N_3) \\ u_3(k) = u_1(k) + u_2(k) \\ u_1(k) = \sin\left[\frac{(y_3 - v_1)\pi}{2(v_2 - v_1)}\right] \cdot u_3(k) \\ u_2(k) = \left\{1 - \sin\left[\frac{(y_3 - v_1)\pi}{2(v_2 - v_1)}\right]\right\} \cdot u_3(k) \end{cases};$$

where $y_1(k)$ represents an output of the electric braking predictive control model at time k; $y_1(k-1)$ represents an output of the electric braking predictive control model at time k−1; $y_1(k-n_a-1)$ represents an output of the electric braking predictive control model at time $k-n_a-1$; $n_a$ represents an output order; $\bar{a}_1$ represents an output coefficient of a first term; $\bar{a}_{n_a+1}$ represents an output coefficient of a $(n_a)$th term; $N_1$ represents a number of sample points with lag in an electric braking process; $b_0$ represents an input coefficient of a 0th term; represents an input coefficient of a $(n_b)$th term; $A$ represents a difference operator; $\Delta u_1(k-1-N_1)$ represents an input of the electric braking predictive control model at time $k-1-N_1$; $\Delta u_1(k-1-n_b-N_1)$ represents an input of the electric braking predictive control model at time $k-1-n_b-N_1$;

$N_2$ represents a number of sample points with lag in a hydraulic braking process; $y_2(k)$ represents an output of the hydraulic braking predictive control model at time k; $y_2(k-1)$ represents an output of the hydraulic braking predictive control model at time k−1; $y_2(k-n_a-1)$ represents an output of the hydraulic braking predictive control model at time $k-n_a-1$; $\Delta u_2(k-1-N_2)$ represents an input of the hydraulic braking predictive control model at time $k-1-N_2$; $\Delta u_2(k-1-n_b-N_2)$ represents an input of the hydraulic braking predictive control model at time $k-1-n_b-N_2$;

$N_3$ represents a number of sample points with lag in an electro-hydraulic hybrid braking process; $y_3(k)$ represents an output of the electro-hydraulic hybrid braking predictive control model at time k; $y_3(k-1)$ represents an output of the electro-hydraulic hybrid braking predictive control model at time k−1; $y_3(k-n_a-1)$ represents an output of the electro-hydraulic hybrid braking predictive control model at time $k-n_a-1$; $\Delta u_3(k-1-N_3)$ represents an input of the electro-hydraulic hybrid braking predictive control model at time $k-1-N_3$; $\Delta u_3(k-1-n_b-N_3)$ represents an input of the electro-hydraulic hybrid braking predictive control model at time $k-1-n_b-N_3$;

$u_1(k)$ represents an electric braking control quantity at time k; $u_2(k)$ represents a hydraulic braking control quantity at time k; $u_3(k)$ represents an electro-hydraulic hybrid braking control quantity at time k; $v_1$ represents a speed at a second conversion point; and $v_2$ represents a speed at a first conversion point;

the output of the electric braking predictive control model, the output of the hydraulic braking predictive control model and the output of the electro-hydraulic hybrid braking predictive control model are all speeds, and the input of the electric braking predictive control model, the input of the hydraulic braking predictive control model and the input of the electro-hydraulic hybrid braking predictive control model are all accelerations;

in a braking process, when a speed of the middle-low speed maglev train is greater than or equal to the speed at the first conversion point, the electric braking predictive control model is adopted to perform electric braking control on the middle-low speed maglev train; when the speed of the middle-low speed maglev train is lower than the speed at the first conversion point and greater than the speed at the second conversion point, the electro-hydraulic hybrid braking predictive control model is adopted to perform electro-hydraulic hybrid braking control on the middle-low speed maglev train; and when the speed of the middle-low speed maglev train is lower than or equal to the speed at the second conversion point, the hydraulic braking predictive control model is adopted to perform hydraulic braking control on the middle-low speed maglev train.

Alternatively, the operation data may include a speed and an acceleration.

The present disclosure further provides a cooperative control system for electro-hydraulic hybrid braking of a middle-low speed maglev train, including:

an operation data denoising module configured to denoise operation data of a middle-low speed maglev train;

a module for determining parameters in a controlled autoregressive integrated moving average model configured to use the controlled autoregressive integrated moving average model as an electro-hydraulic hybrid braking process model for the middle-low speed maglev train and process denoised operation data by using a least square method to determine parameters in the controlled autoregressive integrated moving average model;

a module for establishing a generalized predictive control model with time lag compensation configured to establish a generalized predictive control model with time lag compensation according to the controlled autoregressive integrated moving average model and a Smith predictor; and a cooperative control module configured to perform cooperative control on an electro-hydraulic hybrid braking process of the middle-low speed maglev train by using the generalized predictive control model with time lag compensation.

According to specific embodiments provided by the present disclosure, the present disclosure has the following technical effects.

In the present disclosure, the generalized predictive control model with time lag compensation is established according to the controlled autoregressive integrated moving average model and the Smith predictor, and is used to perform cooperative control on the electro-hydraulic hybrid braking process of the middle-low speed maglev train, thereby reducing a time lag of the electro-hydraulic hybrid braking process of the middle-low speed maglev train.

BRIEF DESCRIPTION OF THE DRAWINGS

To describe the technical solutions in the embodiments of the present disclosure or in the prior art more clearly, the accompanying drawings required in the embodiments will be briefly described below. Apparently, the accompanying drawings in the following description show merely some embodiments of the present disclosure, and other drawings can be derived from these accompanying drawings by those of ordinary skill in the art without creative efforts.

DETAILED DESCRIPTION

The technical solutions in the embodiments of the present disclosure will be clearly and completely described below with reference to the accompanying drawings in the embodiments of the present disclosure. Apparently, the described embodiments are merely some of rather than all of the embodiments of the present disclosure. All other embodiments derived from the embodiments in the present disclosure by those of ordinary skill in the art without creative efforts shall fall within the protection scope of the present disclosure.

An objective of some embodiments of the present disclosure is to provide a cooperative control method and system for electro-hydraulic hybrid braking of a middle-low speed maglev train, which reduces a time lag in an electro-hydraulic hybrid braking process of the middle-low speed maglev train.

To make the above objective, features and advantages of the present disclosure clearer and more comprehensible, the present disclosure will be further described in detail below with reference to the accompanying drawings and the specific embodiments.

In the present disclosure, firstly, based on dynamic analysis of the variation characteristic of operation data of the middle-low speed maglev train, a wavelet threshold denoising method based on hard threshold processing is used to denoise the operation data of the middle-low speed maglev train to reduce the influence of noise on subsequent operation. On this basis, based on a least square method, a controlled autoregressive integrated moving average model for an electro-hydraulic hybrid braking of a middle-low speed maglev train is obtained by using the denoised data through combining a mechanism with data driving. Moreover, with the analysis of multivariable, time-varying, nonlinear, and time lag characteristic of the electro-hydraulic hybrid braking of the middle-low speed maglev train, based on a generalized predictive control method with time lag compensation, a controller switching mechanism is designed by using vehicle characteristics, and an electro-hydraulic braking control quantity is proportioned by using a sinusoidal function, thereby realizing cooperative control for the electro-hydraulic hybrid braking of the middle-low speed maglev train.

Figure 1:
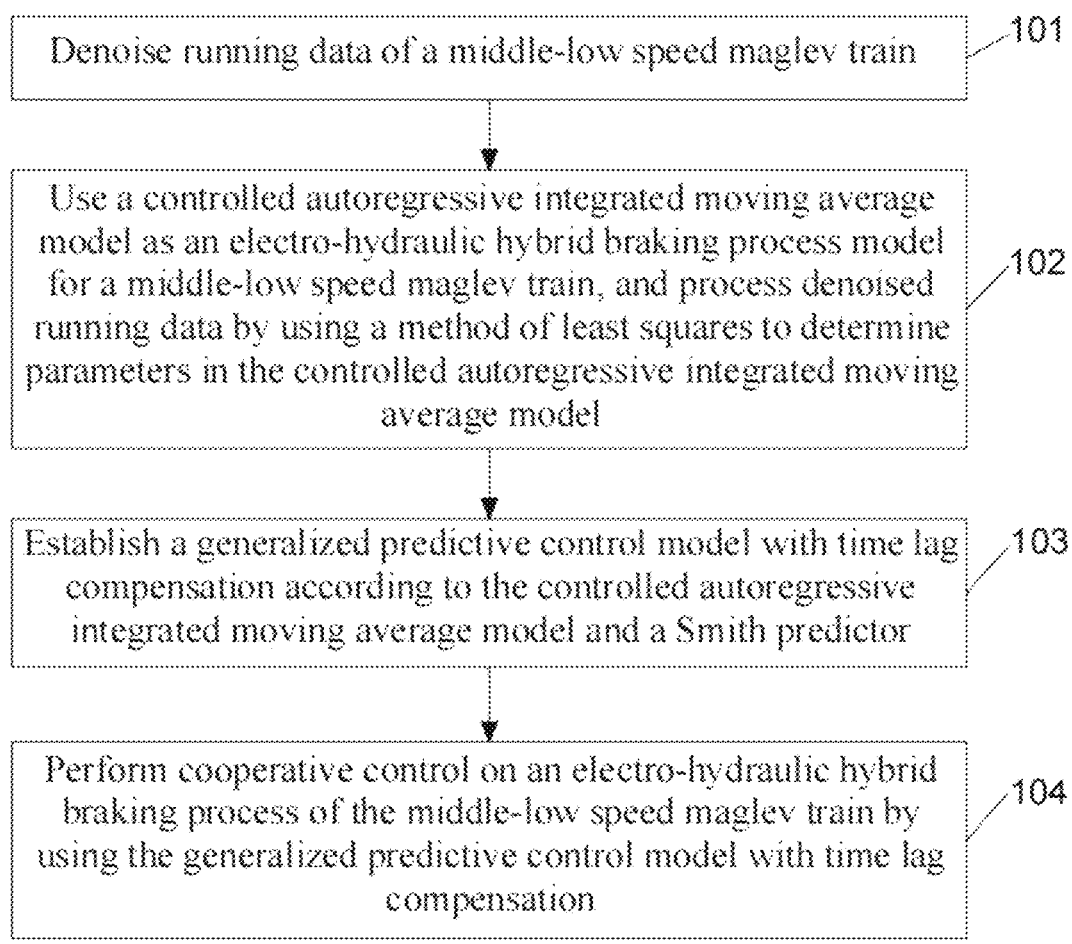
FIG. 1 is a flowchart of a cooperative control method for electro-hydraulic hybrid braking of a middle-low speed maglev train according to the present disclosure.

As shown in FIG. 1, a cooperative control method for electro-hydraulic hybrid braking of a middle-low speed maglev train includes steps 101-104.

In step 101, operation data of a middle-low speed maglev train is denoised.

Figure 2:
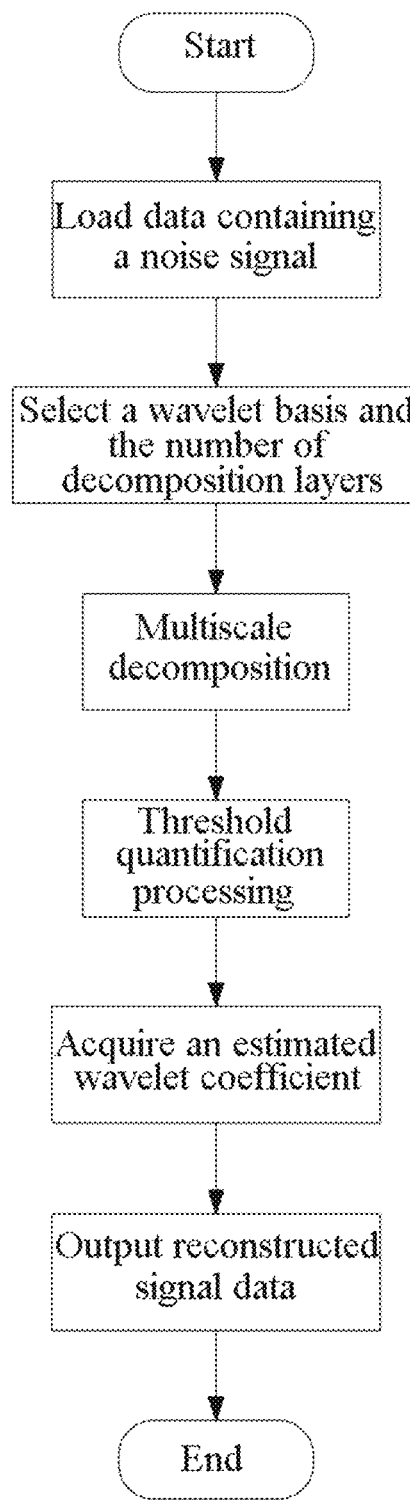
FIG. 2 is a flowchart of denoising running data according to the present disclosure.

The operation data includes a speed and an acceleration. As shown in FIG. 2, the step 101 specifically includes:

performing wavelet denoising on the operation data of the middle-low speed maglev train based on hard threshold processing.

The performing wavelet denoising on the operation data of the middle-low speed maglev train based on hard threshold processing specifically includes:

decomposing the operation data (the operation data of the middle-low speed maglev loaded with a noise signal) into three layers of detail components and one layer of approximate components by using db4 wavelet decomposition, so as to obtain a wavelet detail coefficients for various layers of detail components in the three layers of detail components;

processing the wavelet detail coefficients by a hard threshold processing method to obtain the processed wavelet detail coefficients for the various layers of detail components;

performing threshold quantification processing on the one layer of approximate components to obtain an approximate coefficient; and reconstructing a signal according to the approximate coefficient and the processed wavelet detail coefficients for the various layers of detail components to obtain the denoised operation data.

Figure 3:
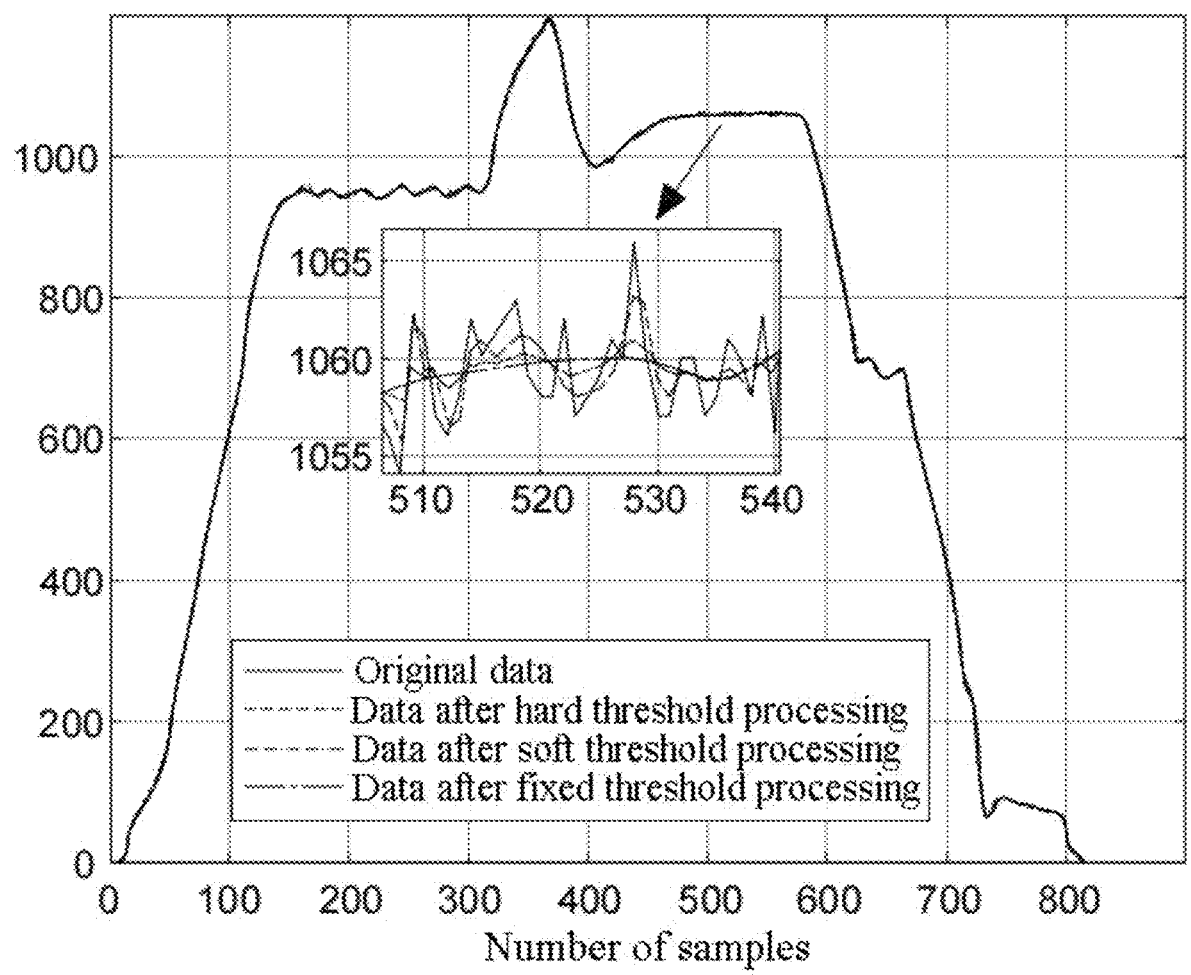
FIG. 3 is a comparison diagram of wavelet denoising of speed data according to the present disclosure.
Figure 4:
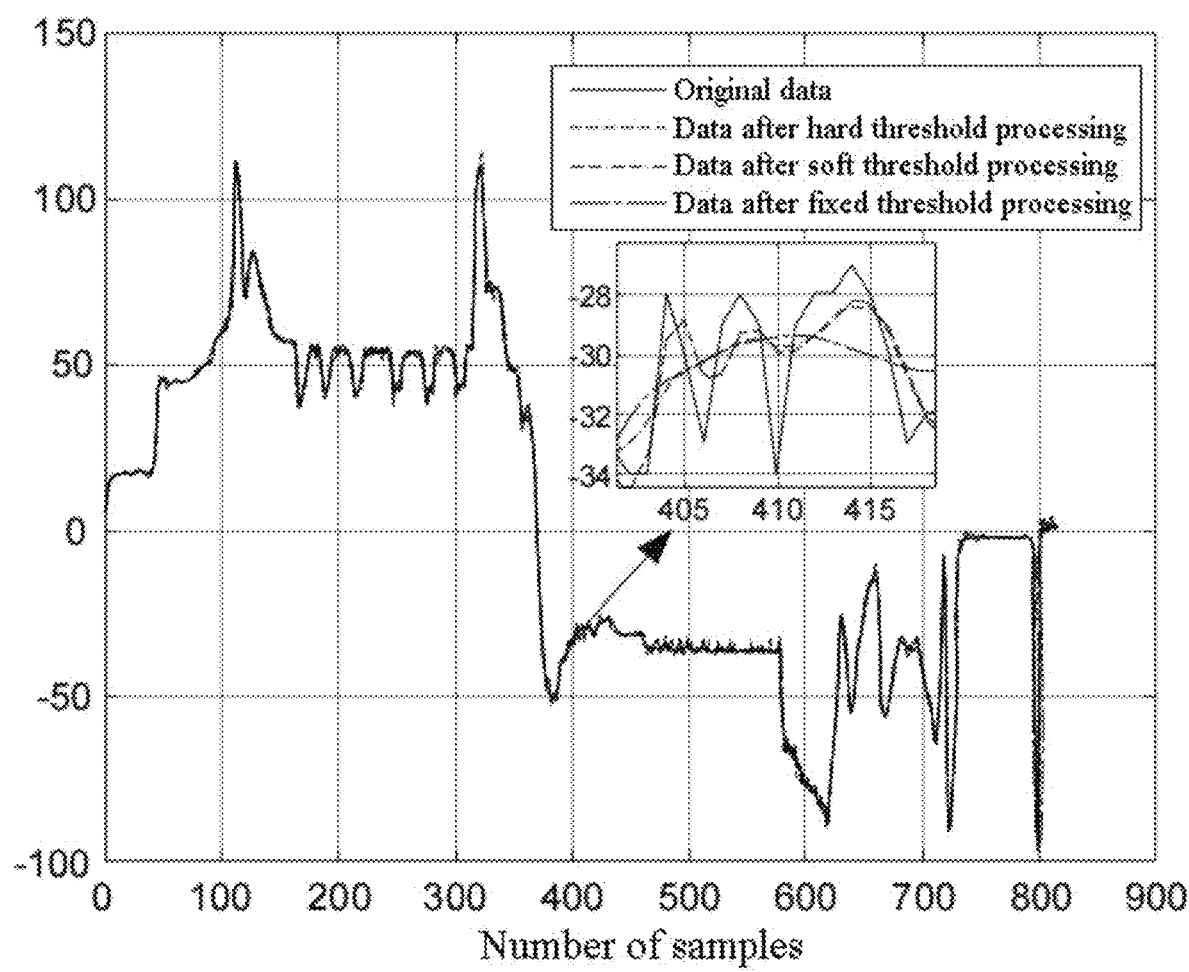
FIG. 4 is a comparison diagram of wavelet denoising of acceleration data according to the present disclosure.

FIG. 3 is a comparison diagram between wavelet denoised speed data based on different threshold processing and original speed data of the middle-low speed maglev train, and FIG. 4 is a comparison diagram between wavelet denoised acceleration data based on different threshold processing and original acceleration data of the middle-low speed maglev train. The ordinate in FIG. 3 represents a speed (cm/s), and the ordinate in FIG. 4 represents an acceleration (cm/s2). As can be seen from FIG. 3 and FIG. 4, for either the speed data or the acceleration data of the middle-low speed maglev train, a solid line trajectory of the data after the hard threshold processing is more consistent with a solid line trajectory of the original data, but the solid line of the data after the hard threshold processing is smoother than the solid line of the original data. As can be seen, a solid line of the data after soft threshold processing and a solid line of the data after fixed threshold processing are much smoother than the solid line of the data after the hard threshold processing and the solid line trajectory of the original data, but they greatly deviate from the original data, and there is excessive denoising, which will lead to signal data distortion. Therefore, the wavelet denoising method based on the hard threshold processing has a significant denoising effect and is not easy to cause signal data distortion, which is more suitable for denoising the operation data of the middle-low speed maglev train, and also provides better data support for subsequent identification of parameters of the generalized predictive control model with time lag compensation.

In step 102, a controlled autoregressive integrated moving average model is used as an electro-hydraulic hybrid braking process model for the middle-low speed maglev train, and denoised operation data is processed by using the least square method to determine parameters of the controlled autoregressive integrated moving average model.

In the step 102, parameters of the electro-hydraulic hybrid braking process model for the middle-low speed maglev train are identified by using the denoised data. That is, by combining a motion mechanism of the middle-low speed maglev train with data driving, the electro-hydraulic hybrid braking process model for the middle-low speed maglev train is obtained based on the least square method.

In Step 103, a generalized predictive control model with time lag compensation is established according to the controlled autoregressive integrated moving average model and a Smith predictor.

The step 103 is specifically as follows.

A prediction model for a controlled object descried with the controlled autoregressive integrated moving average model is expressed as:

$$\begin{cases} \overline{A}(z^{-1})y(k) = B(z^{-1})\Delta u(k-1) + C(z^{-1})\xi(k) \\ A(z^{-1}) = 1 + a_1 z^{-1} + \ldots + a_{n_a} z^{-n_a} \\ \overline{A}(z^{-1}) = (1-z^{-1})A(z^{-1}) = 1 + \overline{a}_1 z^{-1} + \ldots + \overline{a}_{n_a+1} z^{-(n_a+1)}, \\ B(z^{-1}) = 1 + b_1 z^{-1} + \ldots + b_{n_b} z^{-n_b} \\ C(z^{-1}) = 1 + c_1 z^{-1} + \ldots + c_{n_c} z^{-n_c} \end{cases} \quad (1)$$

where the controlled object in the present disclosure represents the middle-low speed maglev train; $y(k)$ represents an output of the prediction model at time k; $\Delta u(k-1)$ represents an input of the prediction model at time k−1; $\xi(k)$ represents white noise at time k; A represents an output coefficient of the prediction model; B represents an input coefficient of the prediction model; C represents a coefficient of noise; $\Delta$ represents a difference operator, $\Delta=1-z^{-1}$, and $z^{-1}$ represents a backward shift operator; k represents a time point of discretization; $n_a$ represents an output order; $n_b$ represents an input order; $n_c$ represents a noise order; $\overline{A}$ represents a result of A multiplied by the backward shift operator; $a_1$ represents a coefficient of a first term in A; $a_{n_a}$ represents a coefficient of a $(n_a)$th term in A; $b_1$ represents a coefficient of a first term in B; represents a coefficient of a $(n_b)$th term in B; $c_1$ represents a coefficient of a first term in C; represents a coefficient of a $(n_c)$th term in C; represents a coefficient of a first term in $\overline{A}$; and $\overline{a}_{n_a+1}$ represents a coefficient of a $(n_a+1)$th term in $\overline{A}$.

For the pure lag characteristic of the operation process of the middle-low speed maglev train, based on the above mechanism, the Smith predictor is introduced. A complex frequency domain transfer function of the Smith predictor may be expressed approximately by a series of a first-order inertial element and a pure lag element as:

$$G_\tau(s) = G_p(s)(1-e^{-\tau s}) = \frac{K_f}{1+T_f s}(1-e^{-\tau s}), \quad (2)$$

where $G_\tau(s)$ represents a transfer function of the Smith predictor; $G_p(s)$ represents a transfer function of the controlled object without the pure lag element; $K_f$ represents a amplification coefficient of the controlled object; $T_f$ represents a time constant of the controlled object; s represents a complex variable in a complex frequency domain; $e^{-\tau s}$ represents the pure tag element of the controlled object; and r represents a pure tag time.

A compensation circuit composed of the Smith predictor and a regulator $D(s)$ (configured to correct $G_p(s)$) is referred to as a pure lag compensator. A transfer function of the pure lag compensator is $D'(s)$:

$$D'(s) = \frac{D(s)}{1+D(s)G_\tau(s)} = \frac{D(s)}{1+D(s)G_p(s)(1-e^{-\tau s})}, \quad (3)$$

A closed-loop transfer function of the compensated system is as follows:

$$\Phi(s) = \frac{D'(s)G_p(s)e^{-\tau s}}{1+D'(s)G_p(s)^{-\tau s}} = \frac{D(s)G_p(s)}{1+d(s)G_p(s)}e^{-\tau s}, \quad (4)$$

where $$\frac{D(s)G_p(s)}{1+D(s)G_p(s)} = \frac{B(s)}{\overline{A}(s)}$$

represents a closed-loop transfer function of a system corresponding to an ordinary prediction model without considering time lag. Therefore, it can be seen that after compensation, the influence of the pure lag on a control system is eliminated, because $e^{-\tau s}$ in the formula is outside a closed-loop control circuit and does not affect the system stability. The displacement principle of Laplace transformation indicates that $e^{-\tau s}$ only shifts the control action on the time coordinate axis by a time τ. A transition process and other performance indicators of the control system are completely the same as when the object characteristic is $G_p(s)$. Therefore, assuming that the controlled object is not affected by a disturbance term, i.e., $\xi(k)=0$, the closed-loop transfer function of the generalized predictive control model with time lag compensation may be derived based on the above principle, which is as follows:

$$\phi(s) = \frac{Y(s)}{\Delta U(s)} = \frac{B(s)}{\overline{A}(s)} e^{-\tau s}, \quad (5)$$

where Y(s) represents a complex frequency domain quantity of y(k) after Laplace transformation;

ΔU(s) represents a complex frequency domain quantity of $\Delta_u(k)$ after Laplace transformation;

$\overline{A}(s)$ represents a complex frequency domain quantity of $\overline{A}$ after Laplace transformation; and B(s) represents a complex frequency domain quantity of B after Laplace transformation. The formula (5) is discretized and then subjected to an inverse Z-transformation to obtain the generalized predictive control model with time lag compensation:

$$\overline{A}(z^{-1})y(k) = B(z^{-1})\Delta u(k-1-N), \quad (6)$$

$$N = \tau T, \quad (7)$$

where N represents a number of sample points with lag; and T represents a sampling period.

By expanding coefficients of the formula (6), the formula (6) may be rewritten in the form of an input-output model:

$$y(k) + \overline{a}_1 y(k-1) + \ldots + \overline{a}_{n_a+1} y(k-n_a-1) = b_0 \Delta u(k-1-N) + \ldots + b_{n_a} \Delta u(k-1-n_a-N), \quad (8)$$

Since the electric braking and hydraulic braking processes of the maglev train differ in time lag, their respective models may be written as a formula (9) and a formula (10), respectively:

$$y_1(k) + \overline{a}_1 y_1(k-1) + \ldots + \overline{a}_{n_a+1} y_1(k-n_a-1) = b_0 \Delta u_1(k-1-N_1) + \ldots + b_{n_a} \Delta u_1(k-1-n_a-N_1), \quad (9)$$

$$y_2(k) + \overline{a}_1 y_2(k-1) + \ldots + \overline{a}_{n_b+1} y_2(k-n_a-1) = b_0 \Delta u_2(k-1-N_2) + \ldots + b_{n_b} \Delta u_2(k-1-n_b-N_2), \quad (10)$$

In the electro-hydraulic hybrid braking process, there are the electric braking mode and the hydraulic braking mode, where the proportion of the electric braking decreases gradually, the proportion of the hydraulic braking increases gradually, the hydraulic braking rises slowly and the electric braking drops rapidly. Therefore, a sinusoidal function may be used as a coefficient to proportion the control quantities of the electric braking and the hydraulic braking:

$$\begin{cases} y_3(k) + \overline{a}_1 y_3(k-1) + \ldots + \overline{a}_{n_a-1} y_3(k-n_a-1) = \\ b_0 \Delta u_3(k-1-N_3) + \ldots + b_{n_b} \Delta u_3(k-1-n_b-N_3) \\ u_3(k) = u_1(k) + u_2(k) \\ u_1(k) = \sin\left[\frac{(y_3 - v_1)\pi}{2(v_2 - v_1)}\right] \cdot u_3(k) \\ u_2(k) = \left\{1 - \sin\left[\frac{(y_3 - v_1)\pi}{2(v_2 - v_1)}\right]\right\} \cdot u_3(k) \end{cases}, \quad (11)$$

where $u_1(k)$ represents an electric braking control quantity at time k; $u_2(k)$ represents a hydraulic braking control quantity at time k; $u_3(k)$ represents an electro-hydraulic hybrid braking control quantity at time k; $y_3(k) \in [v_1, v_2]$; $v_1$ represents a speed at a second conversion point where the electro-hydraulic hybrid braking is converted to the hydraulic braking working condition; and $v_2$ represents a speed at a first conversion point where the electric braking is changed to the electro-hydraulic hybrid braking working condition.

Therefore, in the electric braking phase and the hydraulic braking phase, the control quantities may be obtained according to the models of the formula (9) and the formula (10). In the electro-hydraulic hybrid braking phase, the control quantity may be obtained according to the formula (11) and distributed for the electric braking and the hydraulic braking involved in the electro-hydraulic hybrid braking.

In step 104, cooperative control is performed on the electro-hydraulic hybrid braking process of the middle-low speed maglev train by using the generalized predictive control model with time lag compensation.

The generalized predictive control model with time lag compensation includes an electric braking predictive control model, a hydraulic braking predictive control model, and an electro-hydraulic hybrid braking predictive control model.

The electric braking predictive control model is expressed as:

$$y_1(k) + \overline{a}_1 y_1(k-1) + \ldots + \overline{a}_{n_a+1} y_1(k-n_a-1) = b_0 \Delta u_1(k-1-N_1) + \ldots + b_{n_b} \Delta u_1(k-1-n_b-N_1);$$

the hydraulic braking predictive control model is expressed as:

$$y_2(k) + \overline{a}_1 y_2(k-1) + \ldots + \overline{a}_{n_a+1} y_2(k-n_a-1) = b_0 \Delta u_2(k-1-N_2) + \ldots + b_{n_b} \Delta u_2(k-1-n_b-N_2); \text{ and}$$

the electro-hydraulic hybrid braking predictive control model is expressed as:

$$\begin{cases} y_3(k) + \overline{a}_1 y_3(k-1) + \ldots + \overline{a}_{n_a-1} y_3(k-n_a-1) = \\ b_0 \Delta u_3(k-1-N_3) + \ldots + b_{n_b} \Delta u_3(k-1-n_b-N_3) \\ u_3(k) = u_1(k) + u_2(k) \\ u_1(k) = \sin\left[\frac{(y_3 - v_1)\pi}{2(v_2 - v_1)}\right] \cdot u_3(k) \\ u_2(k) = \left\{1 - \sin\left[\frac{(y_3 - v_1)\pi}{2(v_2 - v_1)}\right]\right\} \cdot u_3(k) \end{cases};$$

where y(k) represents an output of the electric braking predictive control model at time k; $y_1(k-1)$ represents an output of the electric braking predictive control model at time k−1; $y_1(k-n_a-1)$ represents an output of the electric braking predictive control model at time $k-n_a-1$; $n_a$ represents an output order; $\overline{a}_1$ represents an output coefficient of a first term; $\overline{a}_{n_a+1}$ represents an output coefficient of a $(n_a)$th term; $N_1$ represents a number of sample points with lag in the electric braking process; $b_0$ represents an input coefficient of a 0th term; $b_{n_b}$ represents an input coefficient of a $(n_b)$th term; Δ represents a difference operator; $\Delta u_1(k-1-N_1)$ represents an input of the electric braking predictive control model at time $k-1-N_1$; $\Delta u_1(k-1-n_b-N_1)$ represents an input of the electric braking predictive control model at time $k-1-n_b-N_1$;

where $N_2$ represents a number of sample points with lag in the hydraulic braking process; $y_2(k)$ represents an output of the hydraulic braking predictive control model at time k; $y_2(k-1)$ represents an output of the hydraulic braking predictive control model at time k−1; $y_2(k-n_a-1)$ represents an output of the hydraulic braking predictive control model at time $k-n_a-1$; $\Delta u_2(k-1-N_2)$ represents an input of the hydraulic braking predictive control model at time $k-1-N_2$; $\Delta u_2(k-1-n_b-N_2)$ represents an input of the hydraulic braking predictive control model at time $k-1-n_b-N_2$;

where $N_3$ represents a number of sample points with lag in an electro-hydraulic hybrid braking process; $y_3(k)$ represents an output of the electro-hydraulic hybrid braking predictive control model at time k; $y_3(k-1)$ represents an output of the electro-hydraulic hybrid braking predictive control model at time k−1; y₃(k−n_a−1) represents an output of the electro-hydraulic hybrid braking predictive control model at time k−n_a−1; $\Delta u_3(k-1-N_3)$ represents an input of the electro-hydraulic hybrid braking predictive control model at time k−1−N₃; $\Delta u_3(k-1-n_b-N_3)$ represents an input of the electro-hydraulic hybrid braking predictive control model at time k−1−n_b−N₃;

where $u_1(k)$ represents an electric braking control quantity at time k; $u_2(k)$ represents a hydraulic braking control quantity at time k; $u_3(k)$ represents an electro-hydraulic hybrid braking control quantity at time k; $v_1$ represents a speed at the second conversion point; and $v_2$ represents a speed at the first conversion point.

The outputs of the electric braking predictive control model, the hydraulic braking predictive control model and the electro-hydraulic hybrid braking predictive control model are all velocities, and the inputs of the electric braking predictive control model, the hydraulic braking predictive control model and the electro-hydraulic hybrid braking predictive control model are all accelerations.

Figure 5:
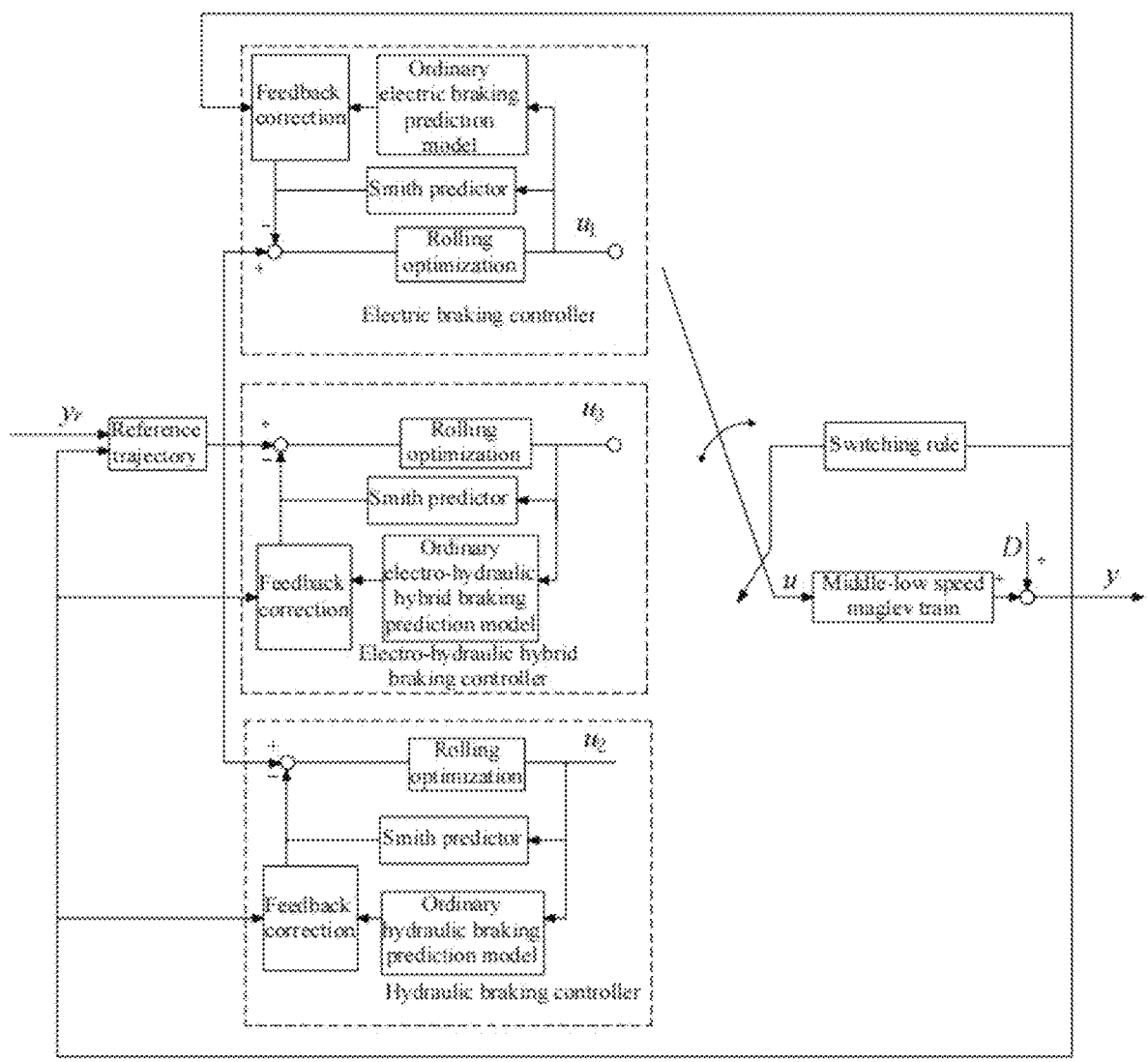
FIG. 5 is a schematic diagram of braking switching of a generalized predictive control model with time lag compensation in a braking process of a middle-low speed maglev train according to the present disclosure.
Figure 6:
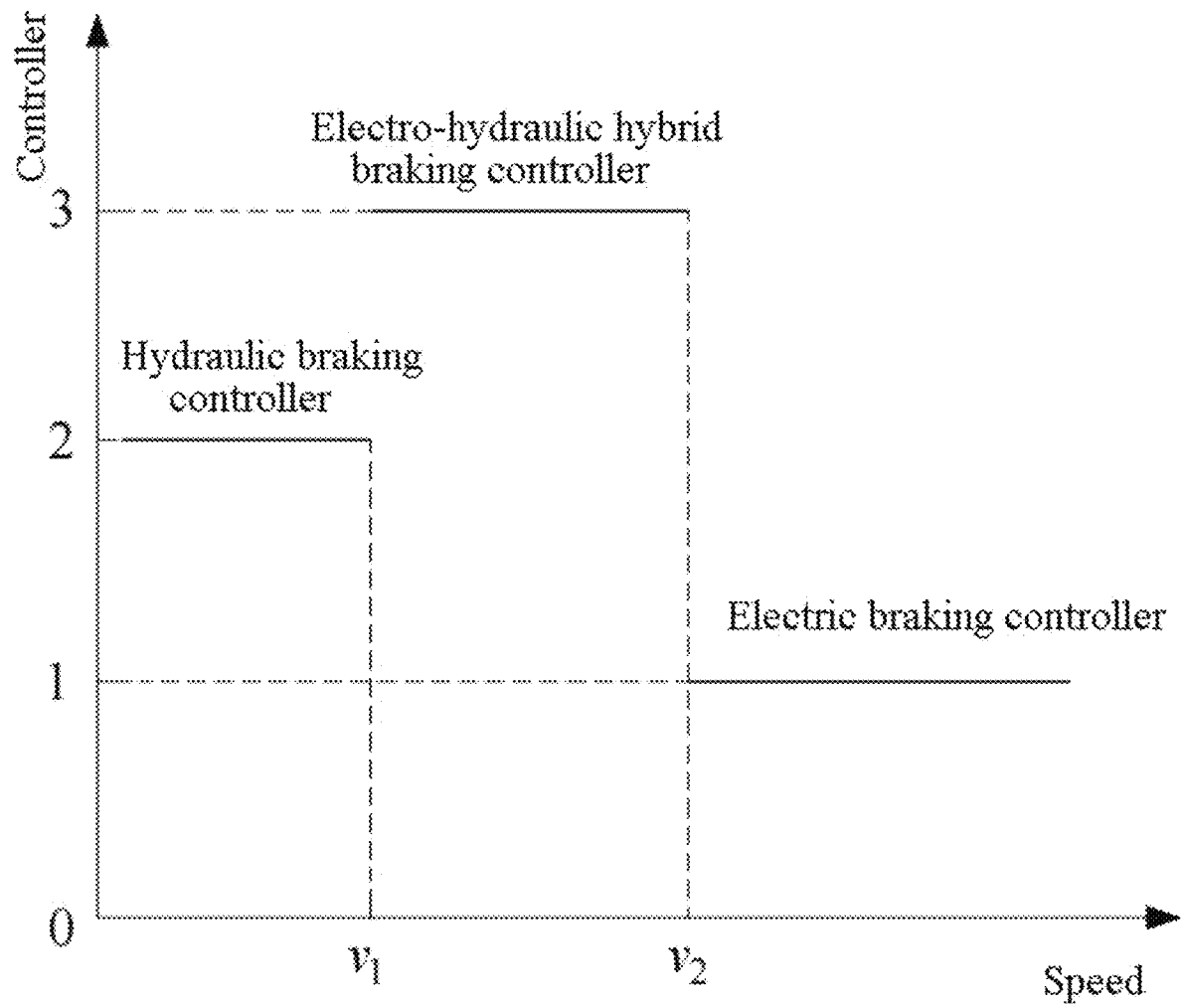
FIG. 6 is a simulation diagram of switching of a controller according to the present disclosure.

As shown in FIG. 5 and FIG. 6, in the braking process, when a speed of the middle-low speed maglev train is greater than or equal to the speed at the first conversion point, the electric braking predictive control model is adopted to perform electric braking control on the middle-low speed maglev train; when the speed of the middle-low speed maglev train is lower than the speed at the first conversion point and greater than the speed at the second conversion point, the electro-hydraulic hybrid braking predictive control model is adopted to perform electro-hydraulic hybrid braking control on the middle-low speed maglev train; and when the speed of the middle-low speed maglev train is lower than or equal to the speed at the second conversion point, the hydraulic braking predictive control model is adopted to perform hydraulic braking control on the middle-low speed maglev train.

In view of the problems of various disturbances, uncertain time lag and difficult processing of time lag characteristic in the electro-hydraulic hybrid braking process of the middle-low speed maglev train, and the difficulty of effective control and decision making in the electro-hydraulic hybrid braking process of the middle-low speed maglev train caused by not considering the time lag characteristic and the electro-hydraulic braking control quantity proportion of the electro-hydraulic hybrid braking process, the present disclosure proposes a method for denoising operation data of a middle-low speed maglev train based on wavelet threshold denoising, which reduces the influence of noise on subsequent operations. Moreover, on this basis, the controlled autoregressive integrated moving average model for the electro-hydraulic hybrid braking process of the middle-low speed maglev train is established. Based on the generalized predictive control method with time lag compensation, the controller switching mechanism is designed by using vehicle characteristics, and the electro-hydraulic braking control quantity is proportioned by using the sinusoidal function, thus realizing cooperative control for the electro-hydraulic hybrid braking process of the middle-low speed maglev train, and avoiding the blindness of a control decision of a traditional maglev train control method for the electro-hydraulic hybrid braking process of the middle-low speed maglev train.

Based on the field data of the middle-low speed maglev train, The effectiveness of the wavelet threshold denoising method for the maglev train is tested, and the feasibility of a time-lag generalized predictive control method for the middle-low speed maglev train and a control quantity distribution strategy and switching mechanism thereof is analyzed. The signal-to-noise ratio (SNR) and root-mean-square error (RMSE) values under different threshold processing may be obtained:

$$SNR = 10\log\left\{\frac{\frac{1}{n}\sum_{i=1}^{n}f^2(i)}{\frac{1}{n}\sum_{i=1}^{n}[f(i)-\hat{f}(i)]^2}\right\}, \quad (12)$$

$$RMSE = \sqrt{\frac{1}{n}\sum_{i=1}^{n}[f(i)-\overline{f}(i)]^2}, \quad (13)$$

where n represents a total number of sample points; f(i) represents original signal data (original operation data); and f̂(i) represents reconstructed signal data after wavelet denoising of the present disclosure.

FIG. 5 shows a switching structure diagram of a prediction model of a time-lag generalized predictive controller (the generalized predictive control model with time lag compensation) for the electro-hydraulic hybrid braking process of the middle-low speed maglev train. In FIG. 5, $u_1$, $u_2$ and $u_3$ represent $u_1(k)$, $u_2(k)$ and $u_3(k)$, respectively; $y_r$ represents a desired speed; y represents an output speed of the prediction model; and D represents a disturbance input. A general generalized predictive control structure is mainly composed of three parts: a prediction model, rolling optimization and feedback correction. The rolling optimization part includes a regulator D(s). As shown in FIG. 5, a Smith predictor module is added on the basis of the general generalized predictive control structure, and the time lag characteristic in the electro-hydraulic hybrid braking process of the middle-low speed maglev train is taken into overall consideration, thereby obtaining a time-lag generalized predictive control structure. The controlled autoregressive integrated moving average model is adopted as the prediction model, and parameters are identified by using the least square method based on the denoised data. Optimization in the prediction model adopts a rolling optimization method, and an optimization objective thereof changes with the passage of time. During each sampling time, the generalized time-lag predictive controller calculates an optimal control input in real time according to an error at this time, and then brings the input into the prediction model to obtain a prediction output of the system. Since the prediction model can repeatedly optimize online according to the latest information to obtain an optimal real-time control rate, it can ensure the robustness and real-time performance of the system well and can well adapt to uncertain situations such as model mismatch and strong disturbance. Correction adopts feedback correction, which makes up for the error of the model, deals with the problem that an existing modeling method cannot realize accurate modeling, further improves the rolling optimization effect. Finally, the Smith predictor is connected in parallel to the controller and configured to compensate the pure lag in the electro-hydraulic hybrid braking process of the middle-low speed maglev train and eliminate the influence of the pure lag on the control system without affecting the stability of the system.

Moreover, FIG. 5 also shows a controller switching architecture in a braking process of the middle-low speed maglev train. The control laws for the electric braking phase and the hydraulic braking phase may be obtained according to formulas (14) and (15) respectively, and then control quantities thereof may be obtained:

$$\Delta u_1(k)=d_{1,1}^T[Y_{r,1}(k+j)-H_1\Delta U_1(k-j)-G_1Y_1(k)]u_1(k)=u_1(k-1)+\Delta u_1(k), \quad (14)$$

$$\Delta u_2(k)=d_{1,2}^T[Y_{r,2}(k+j)-H_2\Delta U_2(k-j)-G_2Y_2(k)]u_2(k)=u_2(k-1)+\Delta u_2(k), \quad (15)$$

where $d_{1,1}^T$ represents a first-beat control increment in an optimal control law for electric braking prediction; $Y_{r,1}(k+j)$ represents a future desired output vector for the electric braking phase; j represents a predictive time domain length; $\Delta U_1(k-j)$ represents a past control increment vector for the electric braking phase; $G_1$ and $H_1$ represent Diophantine equation solutions corresponding to an electric braking model; $Y_1(k)$ represents a past output vector for the electric braking phase; d represents a first-beat control increment in an optimal control law for hydraulic braking prediction; $Y_{r,2}(k+j)$ represents a future desired output vector for the hydraulic braking phase; $A U_2(k-j)$ represents a past control increment vector for the hydraulic braking phase; $G_2$ and $H_2$ represent Diophantine equation solutions corresponding to a hydraulic braking model; and $Y_2(k)$ represents a past output vector for the hydraulic braking phase.

According to the vehicle characteristics of a maglev train, there are respective speeds at working condition conversion point where the electric braking working condition is converted to the electro-hydraulic hybrid braking working condition and the electro-hydraulic hybrid braking working condition is converted to the hydraulic braking working condition during the baking. Therefore, controller switching rules may be divided according to the speeds at the working condition conversion points of the maglev train. When the maglev train is at the electric braking phase, a speed thereof is greater than $v_2$, it can be determined that an electric braking controller (the electric braking predictive control model) is selected; when the maglev train is at the electro-hydraulic hybrid braking phase, a speed thereof is between $v_1$ and $v_2$, it can be determined that an electro-hydraulic hybrid braking controller (the electro-hydraulic hybrid braking predictive control model) is selected; and when the maglev train is at the hydraulic braking phase, a speed thereof is smaller than $v_1$, it can be determined that a hydraulic braking controller (the hydraulic braking predictive control model) is selected. Switching simulation of the respective controllers is as shown in FIG. 6.

As shown in FIG. 7 to FIG. 12, the present disclosure provides an effectiveness analysis method for wavelet threshold denoising field data of a middle-low speed maglev train and a feasibility analysis method for time-lag generalized predictive control for a maglev train and a control quantity distribution strategy and switching mechanism.

Figure 7:
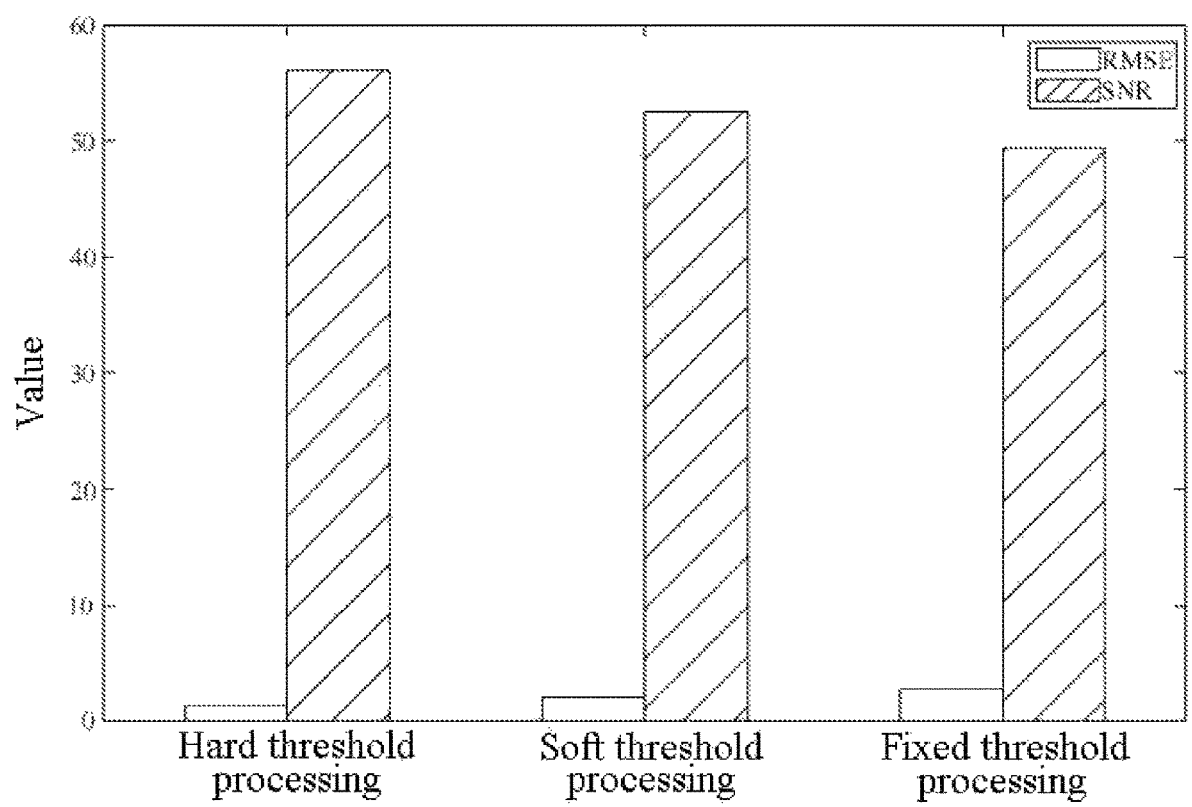
FIG. 7 is a comparison diagram of RMSE and SNR for wavelet denoising of speed data according to the present disclosure.
Figure 8:
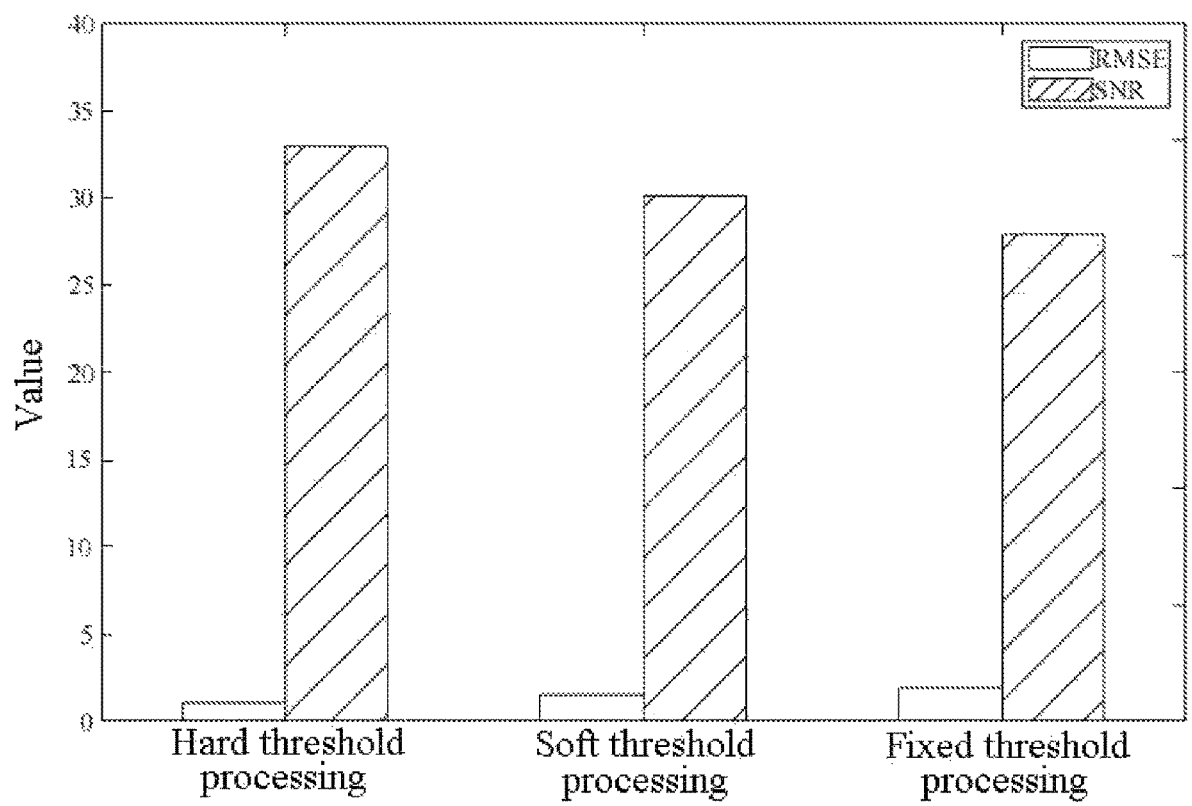
FIG. 8 is a comparison diagram of RMSE and SNR for wavelet denoising of acceleration data according to the present disclosure.

FIG. 7 and FIG. 8 show RMSE values and SNR values of denoising on the speed data and the acceleration data in the field data of the middle-low speed maglev train by the wavelet denoising method based on different threshold processing, respectively. In FIG. 7 and FIG. 8, blank bars represent RMSE values, and grey bars represent SNR values. As shown in FIG. 7 and FIG. 8, for either the speed data or the acceleration data, the RMSE values obtained based on the hard threshold processing are all smaller than those obtained based on the soft threshold processing and the fixed threshold processing, and the SNR values obtained based on the hard threshold processing are all greater than those obtained by the other two processing methods. This indicates that the wavelet denoising method based on the hard threshold processing can not only reduce noise in the operation data of the middle-low speed maglev train, but also well ensure that no distortion occurs in the denoising process, thereby ensuring the authenticity of the denoised data.

Figure 9:
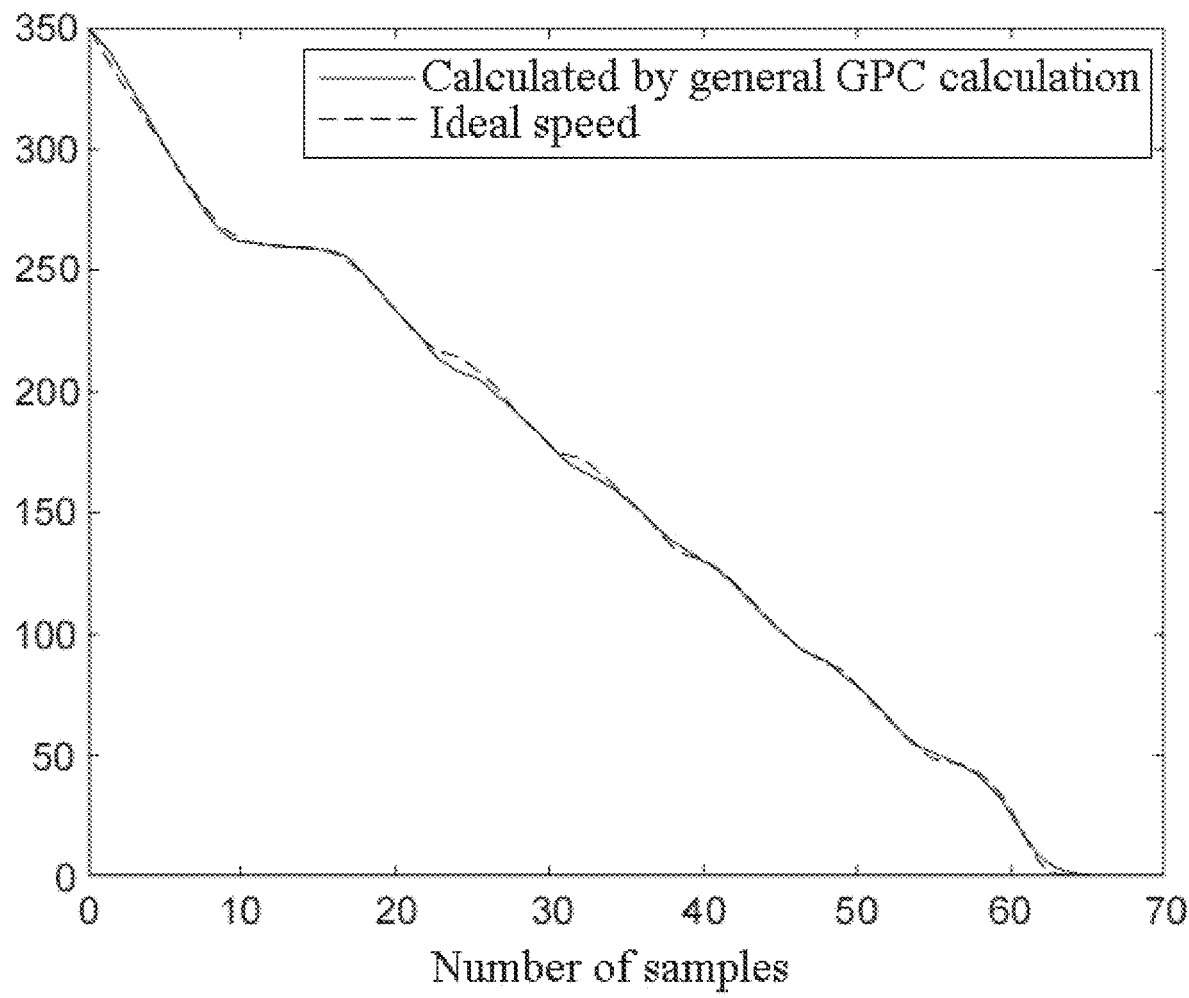
FIG. 9 is a comparison diagram of a speed in existing generalized predictive control.
Figure 10:
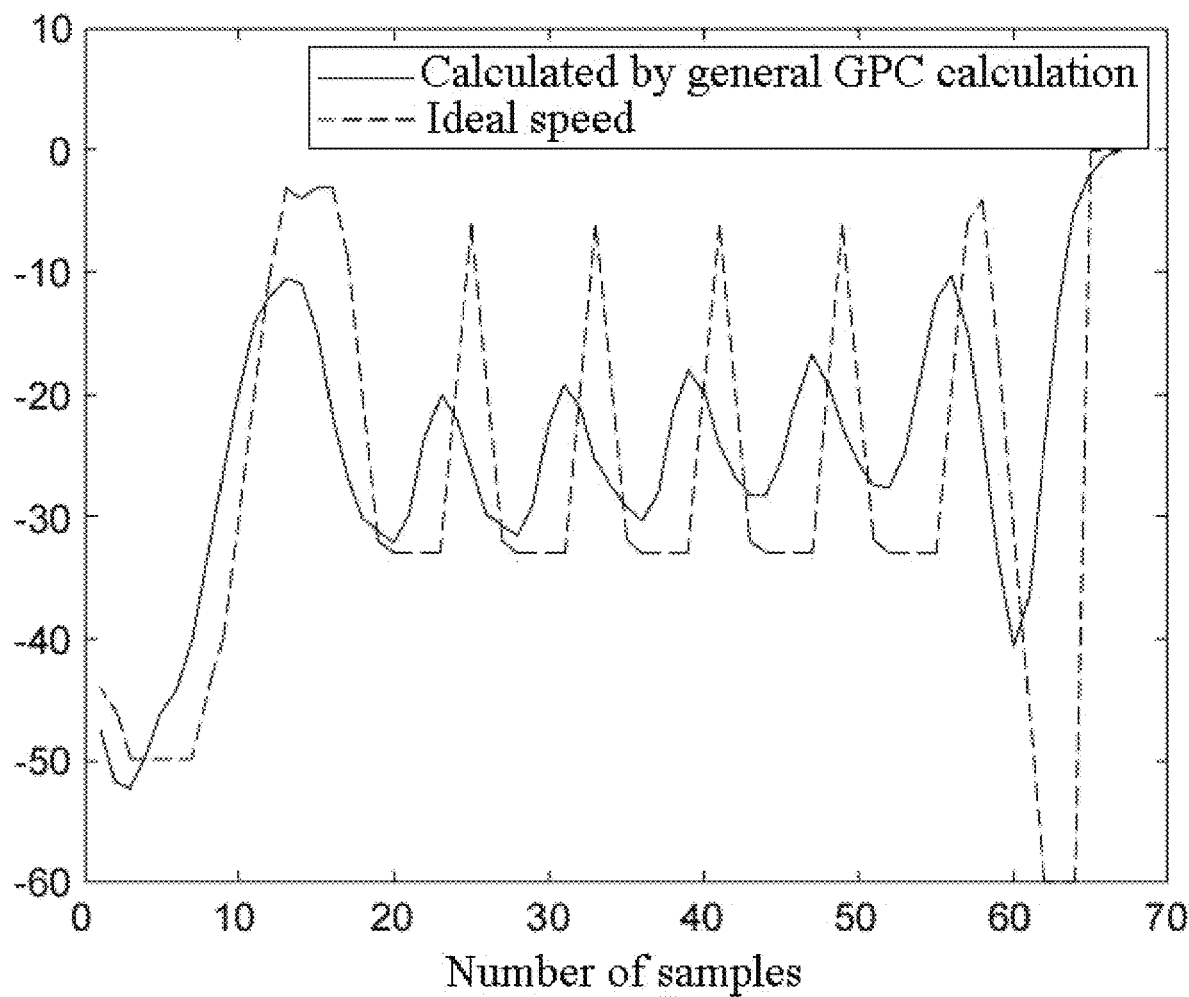
FIG. 10 is a comparison diagram of an acceleration in existing generalized predictive control.
Figure 11:
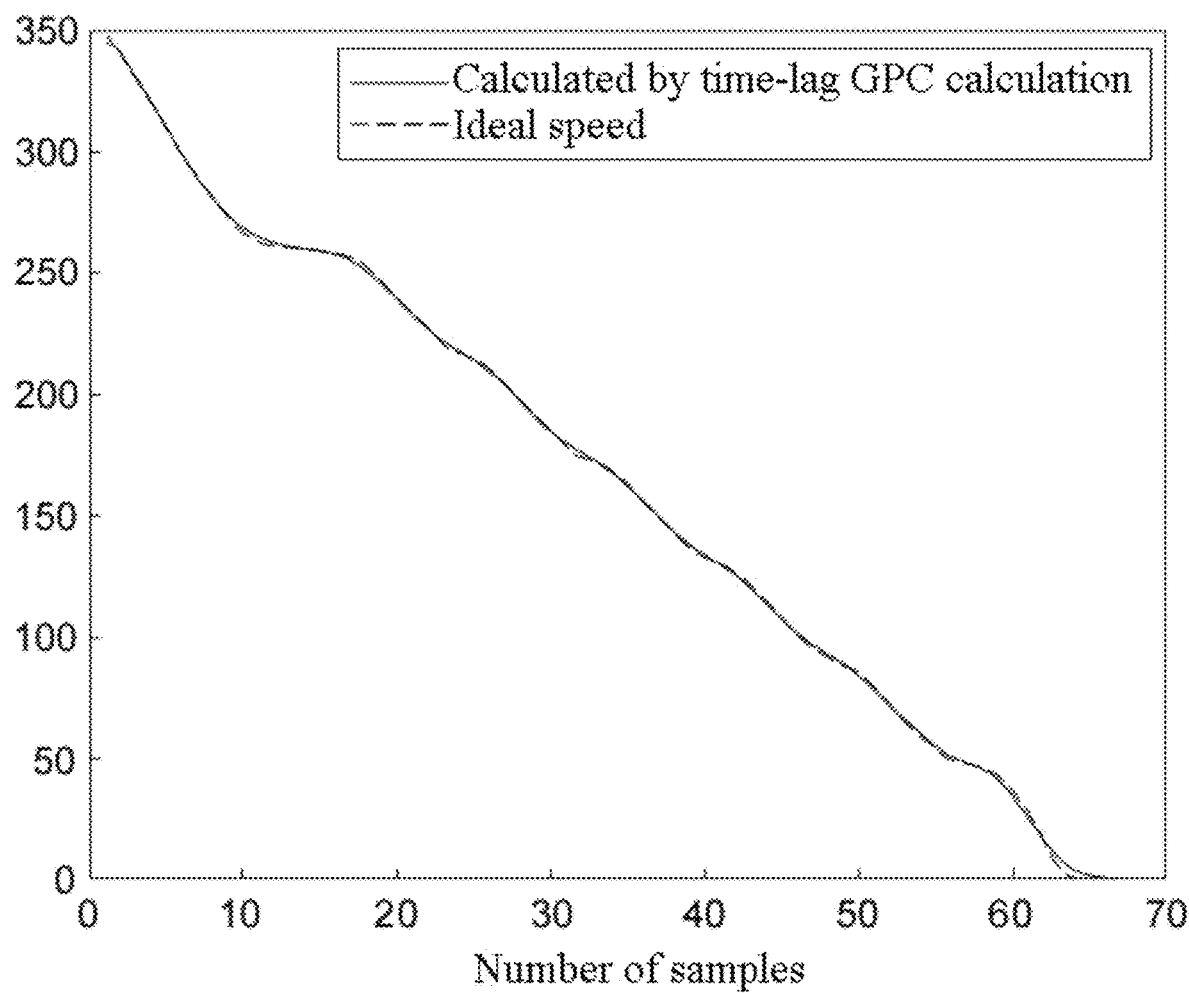
FIG. 11 is a comparison diagram of a speed in time-lag generalized predictive control according to the present disclosure.
Figure 12:
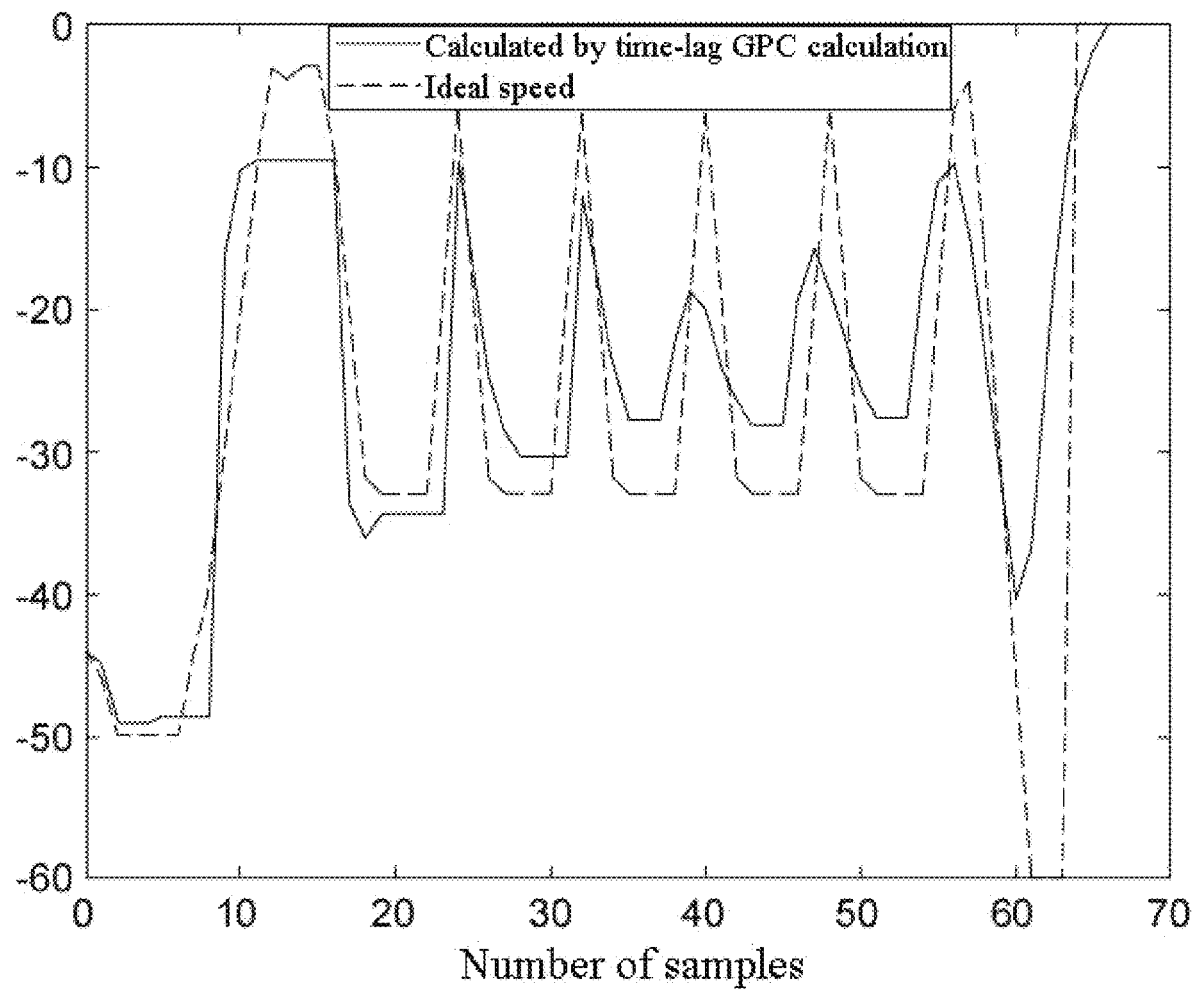
FIG. 12 is a comparison diagram of an acceleration in time-lag generalized predictive control according to the present disclosure.

FIG. 9, FIG. 10, FIG. 11 and FIG. 12 show control decision effects of the electro-hydraulic hybrid braking process of the middle-low speed maglev train based on the existing generalized predictive control and based on time-lag generalized predictive control, respectively. The ordinate in FIG. 9 and FIG. 11 represents a speed (cm/s), and the ordinate in FIG. 10 and FIG. 12 represents an acceleration (cm/s$^2$). FIG. 9 and FIG. 11 are comparison diagrams between speeds at the electro-hydraulic hybrid braking phase of the middle-low speed maglev train calculated based on the existing generalized predictive control method and based on the time-lag generalized predictive control, and planned ideal speeds, respectively, where a dotted line represents the ideal speed, and a solid line represents the speed calculated by the cooperative control method of the present disclosure. By comparison, it can be seen that the solid line trajectory and the dotted line trajectory in FIG. 11 are more consistent, which indicates that compared with the general generalized predictive control method, the time-lag generalized predictive control method proposed in the present disclosure can control the speed in the electro-hydraulic hybrid braking process of the middle-low speed maglev train more effectively. FIG. 10 and FIG. 12 are comparison diagrams between accelerations at the electro-hydraulic hybrid braking phase of the middle-low speed maglev train calculated based on the general generalized predictive control method and based on the time-lag generalized predictive control, and planned ideal accelerations, respectively, where a dotted line represents the ideal acceleration, and a solid line represents the acceleration calculated by the cooperative control method of the present disclosure. By comparison, it can be seen that a phenomenon of the solid line lagging behind the dotted line in FIG. 12 is improved, and the shape of the solid line in FIG. 12 is also closer to the square wave shape of the dotted line, which indicates that compared with the general generalized predictive control method, the time-lag generalized predictive control method, the control quantity distribution strategy and switching mechanism proposed in the present disclosure can effectively compensate the influence of the time lag in the electro-hydraulic hybrid braking process of the middle-low speed maglev train and also can realize the square wave control effect in the electro-hydraulic hybrid braking process of the middle-low speed maglev train more effectively.

In conclusion, in the present disclosure, the time-lag generalized predictive control method, the strategy of designing the controller switching mechanism according to the vehicle characteristics and proportioning the electro-hydraulic braking control quantity by using the sinusoidal function are proposed, which can effectively realize the cooperative control on the electro-hydraulic hybrid braking process of the middle-low speed maglev train, improve the control accuracy thereof, and avoid the blindness of a control decision of a traditional maglev train control method for the electro-hydraulic hybrid braking process of the middle-low speed maglev train.

With the middle-low speed maglev train as an implementation object, in view of the problems of various disturbances, uncertain time lag and difficult processing of time lag characteristic in the electro-hydraulic hybrid braking process of the middle-low speed maglev train, and difficulty in effective control and decision in the electro-hydraulic hybrid braking process of the middle-low speed maglev train caused by not considering the time lag characteristic of the electro-hydraulic hybrid braking process, the present disclosure proposes a cooperative control method for electro-hydraulic hybrid braking of the middle-low speed maglev train. In the cooperative control method, the strong nonlinearity and uncertainty of the operation process of the middle-low speed maglev train are effectively described, and the time lag characteristic in the electro-hydraulic hybrid braking process of the middle-low speed maglev train and the ambiguity of an electro-hydraulic proportion are fully considered, thereby effectively realizing cooperative control on the electro-hydraulic hybrid braking process of the middle-low speed maglev train and improving the control accuracy thereof.

Figure 13:
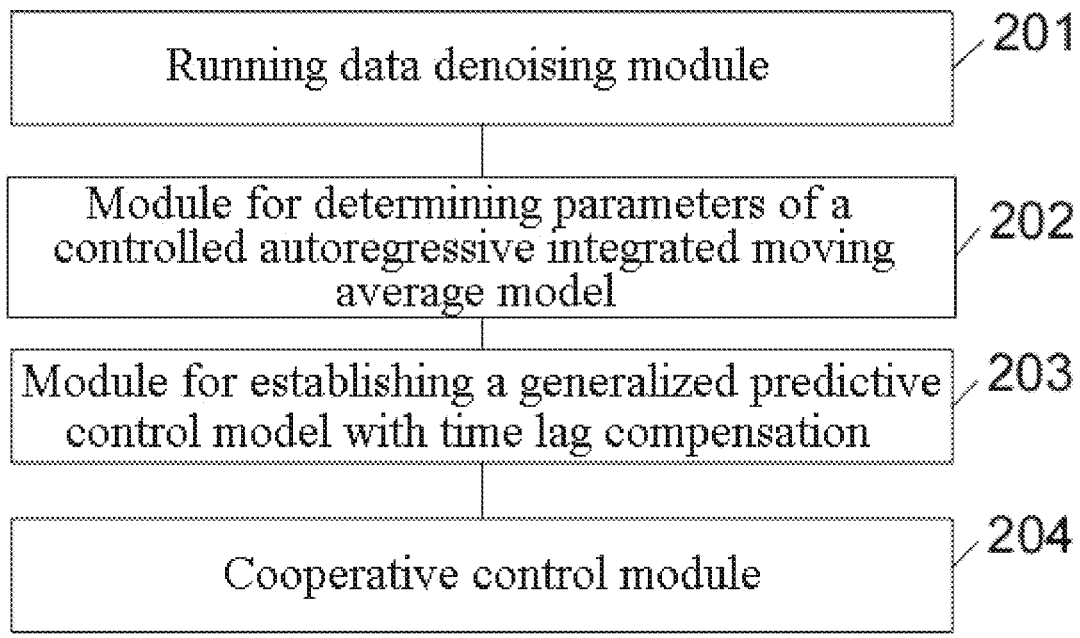
FIG. 13 is a structure schematic diagram of a cooperative control system for electro-hydraulic hybrid braking of a middle-low speed maglev train according to the present disclosure.

FIG. 13 is a structure schematic diagram of a cooperative control system for electro-hydraulic hybrid braking of a middle-low speed maglev train according to the present disclosure.

As shown in FIG. 13, a cooperative control system for electro-hydraulic hybrid braking of a middle-low speed maglev train includes:

an operation data denoising module 201 configured to denoise operation data of a middle-low speed maglev train;

a module for determining parameters in a controlled autoregressive integrated moving average model 202 configured to use the controlled autoregressive integrated moving average model as an electro-hydraulic hybrid braking process model for the middle-low speed maglev train and process the denoised operation data by using a least square method to determine parameters in the controlled autoregressive integrated moving average model;

a module for establishing a generalized predictive control model with time lag compensation 203 configured to establish a generalized predictive control model with time lag compensation according to the controlled autoregressive integrated moving average model and a Smith predictor; and a cooperative control module 204 configured to perform cooperative control on an electro-hydraulic hybrid braking process of the middle-low speed maglev train by using the generalized predictive control model with time lag compensation.

The embodiments in the specification are described in a progressive manner. Each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the contents of the present description shall not be construed as limitations to the present disclosure.

What is claimed is:

1. A cooperative control method for electro-hydraulic hybrid braking of a middle-low speed maglev train, comprising:

denoising operation data of a middle-low speed maglev train;

using a controlled autoregressive integrated moving average model as an electro-hydraulic hybrid braking process model for the middle-low speed maglev train, and processing denoised operation data by using a least square method to determine parameters in the controlled autoregressive integrated moving average model;

establishing a generalized predictive control model with time lag compensation according to the controlled autoregressive integrated moving average model and a Smith predictor; and performing cooperative control on an electro-hydraulic hybrid braking process of the middle-low speed maglev train by using the generalized predictive control model with time lag compensation;

wherein the generalized predictive control model with time lag compensation is an electric braking predictive control model, a hydraulic braking predictive control model, or an electro-hydraulic hybrid braking predictive control model;

the electric braking predictive control model is expressed as:

$$y_1(k) + \bar{a}_1 y_1(k-1) + \ldots + \bar{a}_{n_s+1} y_1(k-n_s-1) = b_0 \Delta u_1(k-1-N_1) + \ldots + b_{n_b} \Delta u_1(k-1-n_b-N_1);$$

the hydraulic braking predictive control model is expressed as:

$$y_2(k) + \bar{a}_1 y_2(k-1) + \ldots + \bar{a}_{n_a-1} y_2(k-n_a-1) = b_0 \Delta u_2(k-1-N_2) + \ldots + b_{n_b} \Delta u_2(k-1-n_b-N_2);$$

the electro-hydraulic hybrid braking predictive control model is expressed as:

$$\begin{cases} y_3(k) + \bar{a}_1 y_3(k-1) + \ldots + \bar{a}_{n_a-1} y_3(k-n_a-1) = \\ \quad b_0 \Delta u_3(k-1-N_3) + \ldots + b_{n_b} \Delta u_3(k-1-n_b-N_3) \\ u_3(k) = u_1(k) + u_2(k) \\ u_1(k) = \sin\left[\dfrac{(y_3 - v_1)\pi}{2(v_2 - v_1)}\right] \cdot u_3(k) \\ u_2(k) = \left\{1 - \sin\left[\dfrac{(y_3 - v_1)\pi}{2(v_2 - v_1)}\right]\right\} \cdot u_3(k) \end{cases};$$

wherein $y_1(k)$ represents an output of the electric braking predictive control model at time k; $y_1(k-1)$ represents an output of the electric braking predictive control model at time k−1;

$y_1(k-n_a-1)$ represents an output of the electric braking predictive control model at time $k-n_a-1$; $n_a$ represents an output order; $\bar{a}_1$ represents an output coefficient of a first term; $\bar{a}_{n_a+1}$ represents an output coefficient of a $(n_a)$th term; $N_1$ represents a number of sample points with lag in an electric braking process; $b_0$ represents an input coefficient of a 0th term; $b_{n_b}$ represents an input coefficient of a $(n_b)$th term; $\Delta$ represents a difference operator; $\Delta u_1(k-1-N_1)$ represents an input of the electric braking predictive control model at time $k-1-N_1$; $\Delta u_1(k-1-n_b-N_1)$ represents an input of the electric braking predictive control model at time $k-1-n_b-N_1$;

$N_2$ represents a number of sample points with lag in a hydraulic braking process;

$y_2(k)$ represents an output of the hydraulic braking predictive control model at time k; $y_2(k-1)$ represents an output of the hydraulic braking predictive control model at time k−1; $y_2(k-n_a-1)$ represents an output of the hydraulic braking predictive control model at time $k-n_a-1$; $\Delta u_2(k-1-N_2)$ represents an input of the hydraulic braking predictive control model at time $k-1-N_2$; $\Delta u_2(k-1-n_b-N_2)$ represents an input of the hydraulic braking predictive control model at time $k-1-n_b-N_2$;

$N_3$ represents a number of sample points with lag in an electro-hydraulic hybrid braking process; $y_3(k)$ represents an output of the electro-hydraulic hybrid braking predictive control model at time k; $y_3(k-1)$ represents an output of the electro-hydraulic hybrid braking predictive control model at time k−1; $y_3(k-n_a-1)$ represents an output of the electro-hydraulic hybrid braking predictive control model at time $k-n_a-1$; $\Delta u_3(k-1-N_3)$ represents an input of the electro-hydraulic hybrid braking predictive control model at time $k-1-N_3$; $\Delta u_3(k-1-n_b-N_3)$ represents an input of the electro-hydraulic hybrid braking predictive control model at time $k-1-n_b-N_3$;

$u_1(k)$ represents an electric braking control quantity at time k; $u_2(k)$ represents a hydraulic braking control quantity at time k; $u_3(k)$ represents an electro-hydraulic hybrid braking control quantity at time k; $v_1$ represents a speed at a second conversion point; and $v_2$ represents a speed at a first conversion point;

the output of the electric braking predictive control model, the output of the hydraulic braking predictive control model and the output of the electro-hydraulic hybrid braking predictive control model are all speeds, and the input of the electric braking predictive control model, the input of the hydraulic braking predictive control model and the input of the electro-hydraulic hybrid braking predictive control model are all accelerations;

in a braking process, when a speed of the middle-low speed maglev train is greater than or equal to the speed at the first conversion point, the electric braking predictive control model is adopted to perform electric braking control on the middle-low speed maglev train; when the speed of the middle-low speed maglev train is lower than the speed at the first conversion point and greater than the speed at the second conversion point, the electro-hydraulic hybrid braking predictive control model is adopted to perform electro-hydraulic hybrid braking control on the middle-low speed maglev train; or when the speed of the middle-low speed maglev train is lower than or equal to the speed at the second conversion point, the hydraulic braking predictive control model is adopted to perform hydraulic braking control on the middle-low speed maglev train.

2. The method according to claim 1, wherein the denoising operation data of a middle-low speed maglev train comprises:

performing wavelet denoising on the operation data of the middle-low speed maglev train based on hard threshold processing.

3. The method according to claim 2, wherein the performing wavelet denoising on the operation data of the middle-low speed maglev train based on hard threshold processing comprises:

decomposing the operation data by using db4 wavelet decomposition into three layers of detail components and one layer of approximate components to obtain wavelet detail coefficients for various layers of detail components of the three layers of detail components;

processing the wavelet detail coefficients by a hard threshold processing method to obtain processed wavelet detail coefficients for the various layers of detail components;

performing threshold quantification processing on the one layer of approximate components to obtain an approximate coefficient; and reconstructing a signal according to the approximate coefficient and the processed wavelet detail coefficients for the various layers of detail components to obtain the denoised operation data.

4. The method according to claim 1, wherein the operation data comprises a speed and an acceleration.

5. A cooperative control system for electro-hydraulic hybrid braking of a middle-low speed maglev train, comprising a processor and a memory having instructions stored, wherein the processor executes the instructions stored in the memory to perform following steps:

denoising operation data of a middle-low speed maglev train;

processing denoised operation data by using a least square method to determine parameters in a controlled autoregressive integrated moving average model used as an electro-hydraulic hybrid braking process model for the middle-low speed maglev train, and;

establishing a generalized predictive control model with time lag compensation according to the controlled autoregressive integrated moving average model and a Smith predictor; and performing cooperative control on an electro-hydraulic hybrid braking process of the middle-low speed maglev train by using the generalized predictive control model with time lag compensation;

wherein the generalized predictive control model with time lag compensation is an electric braking predictive control model, a hydraulic braking predictive control model, or an electro-hydraulic hybrid braking predictive control model;

the electric braking predictive control model is expressed as:

$y_1(k)+\bar{a}_1 y_1(k-1)+\ldots+\bar{a}_{n_a+1} y_1(k-n_a-1)=b_0\Delta u_1(k-1-N_1)+\ldots+\Delta u_1(k-1-n_b-N_1)$ the hydraulic braking predictive control model is expressed as:

$y_2(k)+\bar{a}_1 y_2(k-1)+\ldots+\bar{a}_{n_a+1} y_2(k-n_a-1)=b_0\Delta u_2(k-1-N_2)+\ldots+\Delta u_2(k-1-n_b-N_2)$ the electro-hydraulic hybrid braking predictive control model is expressed as:

$$\begin{cases} y_3(k)+\bar{a}_1 y_3(k-1)+\ldots+\bar{a}_{n_a-1} y_3(k-n_a-1) = \\ b_0\Delta u_3(k-1-N_3)+\ldots+b_{n_b}\Delta u_3(k-1-n_b-N_3) \\ u_3(k) = u_1(k)+u_2(k) \\ u_1(k) = \sin\left[\frac{(y_3-v_1)\pi}{2(v_2-v_1)}\right]\cdot u_3(k) \\ u_2(k) = \left\{1-\sin\left[\frac{(y_3-v_1)\pi}{2(v_2-v_1)}\right]\right\}\cdot u_3(k) \end{cases};$$

wherein $y_1(k)$ represents an output of the electric braking predictive control model at time k; $y_1(k-1)$ represents an output of the electric braking predictive control model at time k−1;

$y_1(k-n_a-1)$ represents an output of the electric braking predictive control model at time $k-n_a-1$; $n_a$ represents an output order; $\bar{a}_1$ represents an output coefficient of a first term; $\bar{a}_{n_a+1}$ represents an output coefficient of a $(n_a)$th term; $N_1$ represents a number of sample points with lag in an electric braking process; $b_0$ represents an input coefficient of a 0th term; $b_{n_b}$ represents an input coefficient of a $(n_b)$th term; $\Delta$ represents a difference operator; $\Delta u_1(k-1-N_1)$ represents an input of the electric braking predictive control model at time $k-1-N_1$; $\Delta u_1(k-1-n_b-N_1)$ represents an input of the electric braking predictive control model at time $k-1-n_b-N_1$;

$N_2$ represents a number of sample points with lag in a hydraulic braking process;

$y_2(k)$ represents an output of the hydraulic braking predictive control model at time k; $y_2(k-1)$ represents an output of the hydraulic braking predictive control model at time $k-1$; $y_2(k-n_a-1)$ represents an output of the hydraulic braking predictive control model at time $k-n_a-1$; $\Delta u_2(k-1-N_2)$ represents an input of the hydraulic braking predictive control model at time $k-1-N_2$; $\Delta u_2(k-1-n_b-N_2)$ represents an input of the hydraulic braking predictive control model at time $k-1-n_b-N_2$;

$N_3$ represents a number of sample points with lag in an electro-hydraulic hybrid braking process; $y_3(k)$ represents an output of the electro-hydraulic hybrid braking predictive control model at time k; $y_3(k-1)$ represents an output of the electro-hydraulic hybrid braking predictive control model at time $k-1$; $y_3(k-n_a-1)$ represents an output of the electro-hydraulic hybrid braking predictive control model at time $k-n_a-1$; $\Delta u_3(k-1-N_3)$ represents an input of the electro-hydraulic hybrid braking predictive control model at time $k-1-N_3$; $\Delta u_3(k-1-n_b-N_3)$ represents an input of the electro-hydraulic hybrid braking predictive control model at time $k-1-n_b-N_3$;

$u_1(k)$ represents an electric braking control quantity at time k; $u_2(k)$ represents a hydraulic braking control quantity at time k; $u_3(k)$ represents an electro-hydraulic hybrid braking control quantity at time k; $v_1$ represents a speed at a second conversion point; and $v_2$ represents a speed at a first conversion point;

the output of the electric braking predictive control model, the output of the hydraulic braking predictive control model and the output of the electro-hydraulic hybrid braking predictive control model are all speeds, and the input of the electric braking predictive control model, the input of the hydraulic braking predictive control model and the input of the electro-hydraulic hybrid braking predictive control model are all accelerations;

in a braking process, when a speed of the middle-low speed maglev train is greater than or equal to the speed at the first conversion point, the electric braking predictive control model is adopted to perform electric braking control on the middle-low speed maglev train; when the speed of the middle-low speed maglev train is lower than the speed at the first conversion point and greater than the speed at the second conversion point, the electro-hydraulic hybrid braking predictive control model is adopted to perform electro-hydraulic hybrid braking control on the middle-low speed maglev train; or when the speed of the middle-low speed maglev train is lower than or equal to the speed at the second conversion point, the hydraulic braking predictive control model is adopted to perform hydraulic braking control on the middle-low speed maglev train.

\* \* \* \* \*